(12) United States Patent
Kurita

(10) Patent No.: US 9,669,853 B2
(45) Date of Patent: Jun. 6, 2017

(54) TRAIN CONTROL SYSTEM

(71) Applicant: THE NIPPON SIGNAL CO., LTD., Tokyo (JP)

(72) Inventor: Akira Kurita, Kuki (JP)

(73) Assignee: THE NIPPON SIGNAL CO., LTD., Tokyo (JP)

( * ) Notice: Subject to any disclaimer, the term of this patent is extended or adjusted under 35 U.S.C. 154(b) by 255 days.

(21) Appl. No.: 14/227,544

(22) Filed: Mar. 27, 2014

(65) Prior Publication Data

US 2014/0209758 A1   Jul. 31, 2014

Related U.S. Application Data

(63) Continuation of application No. PCT/JP2012/074417, filed on Sep. 24, 2012.

(30) Foreign Application Priority Data

Sep. 30, 2011   (JP) .................................. 2011-218250

(51) Int. Cl.
   *B61L 27/00*   (2006.01)
   *B60L 15/40*   (2006.01)
   (Continued)

(52) U.S. Cl.
   CPC ........... *B61L 27/0038* (2013.01); *B60L 15/40* (2013.01); *B61L 3/00* (2013.01); *B61L 11/00* (2013.01);
   (Continued)

(58) Field of Classification Search
   CPC ........ B61L 25/00; B61L 25/02; B61L 25/025; B61L 27/0038; B61L 27/04
   (Continued)

(56) References Cited

U.S. PATENT DOCUMENTS 5,437,422 A  *  8/1995  Newman ............. B61L 27/0038
                                                    246/182 R
8,467,920 B2      6/2013  Asuka et al.
(Continued)

FOREIGN PATENT DOCUMENTS

CN          102089180 A      6/2011
EP          0 554 983 A1     8/1993
(Continued)

*Primary Examiner* — Zachary Kuhfuss
(74) *Attorney, Agent, or Firm* — Foley & Lardner LLP

(57)   ABSTRACT

The train control system includes: an on-board device 3 mounted on a train 2 traveling on a predetermined track 1; a vehicle radio set 4 that transmits and receives information of the on-board device 3; wayside radio sets 5 each of which is disposed at a predetermined location on the ground to transmit information to and receive information from the vehicle radio set 4 information; a ground device 8 placed by the track 1 and connected to the wayside radio set 5; an operation controlling device 12 that transmits operation information of the train 2 to the ground device 8; and an interlocking device 11 that performs an operation control of a turnout 6 for switching tracks. The ground device 8 detects the location of the train 2 on the basis of wireless propagation time between the vehicle radio set 4 and the wayside radio set 5, receives entering track information of the train 2 from the operation controlling device 12, and controls an interval between a preceding train 2 and a following train 2.

6 Claims, 3 Drawing Sheets

(51) Int. Cl.
*B61L 3/00* (2006.01)
*B61L 11/00* (2006.01)
*B61L 15/00* (2006.01)
*B61L 21/10* (2006.01)
*B61L 23/14* (2006.01)
*B61L 25/02* (2006.01)

(52) U.S. Cl.
CPC ........... *B61L 15/00* (2013.01); *B61L 15/0027* (2013.01); *B61L 21/10* (2013.01); *B61L 23/14* (2013.01); *B61L 25/025* (2013.01); *B60L 2200/26* (2013.01); *B60L 2240/12* (2013.01); *B60L 2240/62* (2013.01); *B60L 2240/627* (2013.01); *Y02T 10/7291* (2013.01); *Y02T 90/16* (2013.01); *Y02T 90/162* (2013.01)

(58) Field of Classification Search
USPC .......................................................... 246/2 S
See application file for complete search history.

(56) References Cited

U.S. PATENT DOCUMENTS

2002/0088904 A1\* 7/2002 Meyer .................. B61L 25/025
246/124
2011/0108677 A1   5/2011 Asuka et al.

FOREIGN PATENT DOCUMENTS

| JP | 09-193805 A | 7/1997 |
| JP | 2001-030905 A | 2/2001 |
| JP | 2001-158356 A | 6/2001 |
| JP | 2002-059832 A | 2/2002 |
| JP | 2004-051053 A | 2/2004 |
| JP | 2004-359156 A | 12/2004 |
| JP | 2007-331629 A | 12/2007 |
| WO | WO-93/15946 A1 | 8/1993 |
| WO | WO-2004/040327 A1 | 5/2004 |
| WO | WO 2005/120926 A1 | 12/2005 |

\* cited by examiner

TRAIN CONTROL SYSTEM

This application is a continuation application of PCT/JP2012/074417, filed on Sep. 24, 2012.

BACKGROUND OF THE INVENTION

1. Field of the Invention

The present invention relates to a train control system, and more specifically, relates to a train control system of detecting a train location by using radio distance measurement and controlling the train.

2. Description of Related Art

Conventionally, in a train control system using a so-called radio distance measurement system, a vehicle radio set is mounted on a train, a wireless network is formed between the vehicle radio set and a plurality of wayside radio sets which is spatially separated and disposed along a wayside of a track on which the train travels, and then, wireless propagation delay (time) between an on-board antennal of the vehicle radio set and a wayside antenna of the wayside radio set is measured, to detect a train location, so that train control is performed on the basis of the detected train location.

As a train control system using such a radio distance measurement system, conventionally, for example, a technique including: wireless train location detecting unit that detects a train location on a predetermined track on the basis of a propagation time of a radio wave between a vehicle radio set mounted on a train traveling on the predetermined track and a ground radio set disposed at a predetermined location on the ground; a travel distance calculating unit that calculates a travel distance of the train on the predetermined tack on the basis of an output signal of a tachometer generator connected to an axle of the train; a temporary reference location setting unit that sets the train location detected by the wireless train location detecting unit as a predetermined temporary reference location; and train location detection calculating unit that detects a train location on the predetermined track on the basis of the temporary reference location set by the temporary reference location setting unit and on the basis of the travel distance calculated by the travel distance calculating unit, has been disclosed (refer to, for example, Japanese Laid-open (Kokai) Patent Application Publication No. 2007-331629).

In so-called moving block control as described in the conventional technique, a control with shortened operation intervals can be performed by detecting the distance to a preceding train, however, for example, in a station yard, it is necessary to switch a turnout according to a track on which a train arrives at a station. Therefore, even in the case in which the railroad tracks on which a preceding train and a following train arrive at the station are different, when the route of the preceding train is locked by an interlocking device, the following train cannot move to the route of itself. After the preceding train passes through the turnout, the lock of the turnout is released, and then, the turnout is switched and locked, and thereafter, the traveling of the following train is allowed. Therefore, there is a problem such that the following train has to temporarily stop and wait until switching of the turnout is completed.

SUMMARY OF THE INVENTION

The present invention has been made in view of the abovementioned problem, and an object of the present invention is to provide a train control system capable of making a following train travel without stopping it even in the case in which train entering tracks of a preceding train and the following train are different.

In order to achieve the above object, an aspect of the present invention provides a train control system according to claim 1, including: an on-board device that is mounted on a train traveling on a predetermined track; a vehicle radio set that transmits and receives information of the on-board device; wayside radio sets each of which is disposed at a predetermined location on the ground to transmit information to and receive information from the vehicle radio set; a ground device that is placed by the track and connected to the wayside radio sets; an operation controlling device that transmits operation information of the train to the ground device; and an interlocking device that performs an operation control of a turnout for switching railroad tracks. The ground device detects a train location on the basis of wireless propagation time between the vehicle radio set and the wayside radio set, receives train entering track information from the operation controlling device, and controls an interval between a preceding train and a following train.

According to an another aspect of the present invention, according to claim 2, in addition to the features of claim 1, the ground device determines whether or not the following train enters a track which differs from that of the preceding train on the basis of the train entering track information transmitted from the operation controlling device, in the case in which the train entering tracks are different, calculates traveling speed at which the following train can travel without stopping until the switching operation of the turnout is completed after the preceding train passes through the turnout, and transmits the calculated traveling speed to the on-board device.

According to a further aspect of the present invention, according to claim 3, in addition to the features of claim 2, an approach point is set in a predetermined location before the turnout on the track, and the ground device determines whether or not the following train enters a track which differs from that of the preceding train on the basis of the train entering track information transmitted from the operation controlling device, in the case in which the train entering tracks are different, the ground device calculates traveling speed of the following train in accordance with the condition that "time until the preceding train passes through a detector locking section" equals to "time until the following train reaches the approach point", and transmits the calculated traveling speed to the on-board device.

According to a further aspect of the present invention, according to claim 4, in addition to the features of claim 1, the train entering track is a track on which a train arrives at a station.

According to the embodiment of the invention according to claim 1, the train entering track information is received by the ground device from the operation controlling device, and the interval between a preceding train and a following train is controlled. Therefore, even in the case in which the train entering track of the preceding train and that of the following train are different, the following train can be made travel at a proper interval.

According to the embodiment of the invention according to claim 2, the ground device determines whether or not the following train enters a track which differs from that of the preceding train on the basis of the train entering track information transmitted from the operation controlling device, in the case in which the train entering tracks thereof are different, calculates traveling speed at which the following train can travel without stopping until the switching operation of the turnout is completed after the preceding train passes through the turnout, and controls the travel of the train at the calculated traveling speed. Therefore, even in the case in which the train entering track of the preceding train and that of the following train are different, the following train can be made travel without stopping.

According to the embodiment of the invention according to claim 3, the ground device determines whether or not the following train enters a track which differs from that of the preceding train on the basis of the train entering track information transmitted from the operation controlling device, in the case in which the train entering tracks thereof are different, calculates traveling speed of the following train so that time until the following train reaches the approach point equals to time until the preceding train passes through a detector locking section, and controls the speed of the following train on the basis of the calculated traveling speed. Therefore, even in the case in which the train entering track of the preceding train and that of the following train are different, the following train can be made travel without stopping.

According to the embodiment of the invention according to claim 4, the train entering track is a track on which a train arrives at a station. Therefore, even in the case in which the train entering track of a preceding train and that of a following train are different in a station yard, the following train can be made travel without stopping.

DESCRIPTION OF THE PREFERRED EMBODIMENTS

Hereinbelow, an embodiment of the present invention will be described with reference to the accompanying drawings.

Figure 1:
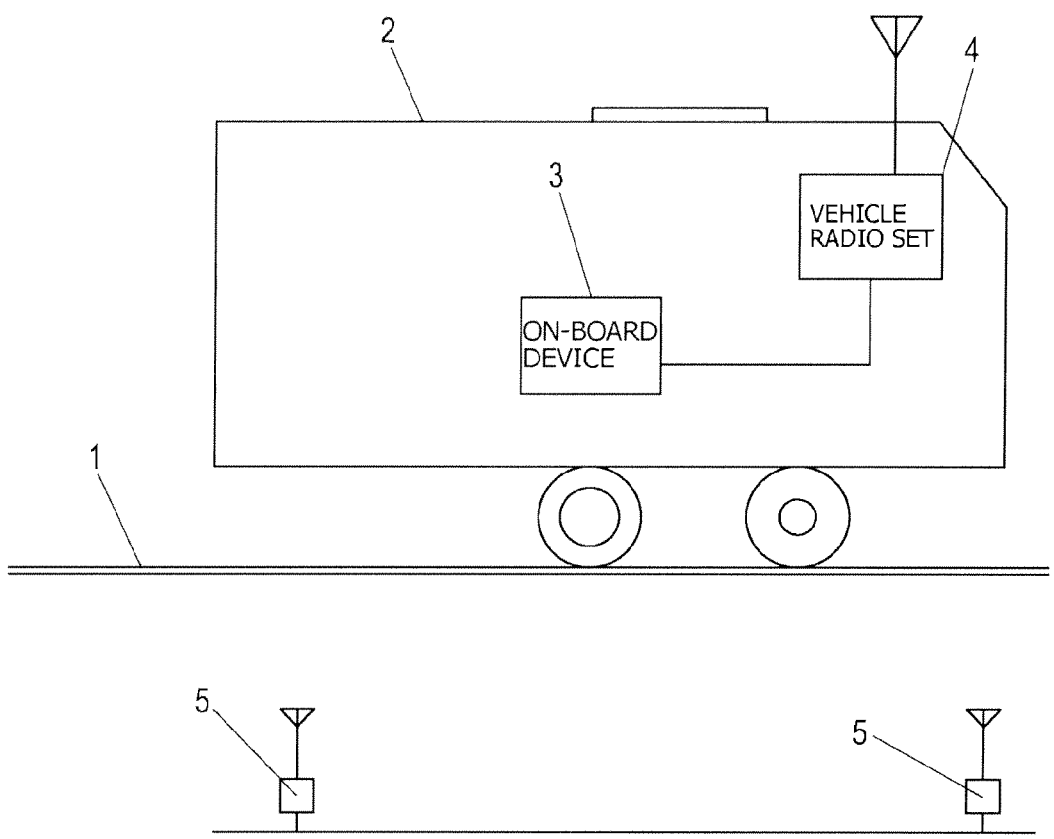
FIG. 1 is a schematic configuration view illustrating a train part in an embodiment of a train control system according to the present invention.

FIG. 1 is a schematic configuration view illustrating an embodiment of a train control system according to the present invention. In the embodiment, an on-board device 3 is mounted on a train 2 traveling on a predetermined track 1. The on-board device 3 has an arithmetic processor (not illustrated) constructed mainly by a CPU and is configured to perform various controls such as a speed control and a braking control of the train 2.

On the train 2, a vehicle radio set 4 connected to the on-board device 3 is also mounted. A plurality of wayside radio sets 5 that transmits information to and receives information from the vehicle radio set 4, are disposed along a wayside of the track 1 of the train 2. Information is transmitted and received between the wayside radio sets 5 and the vehicle radio set 4 in the traveling train 2.

Figure 2:
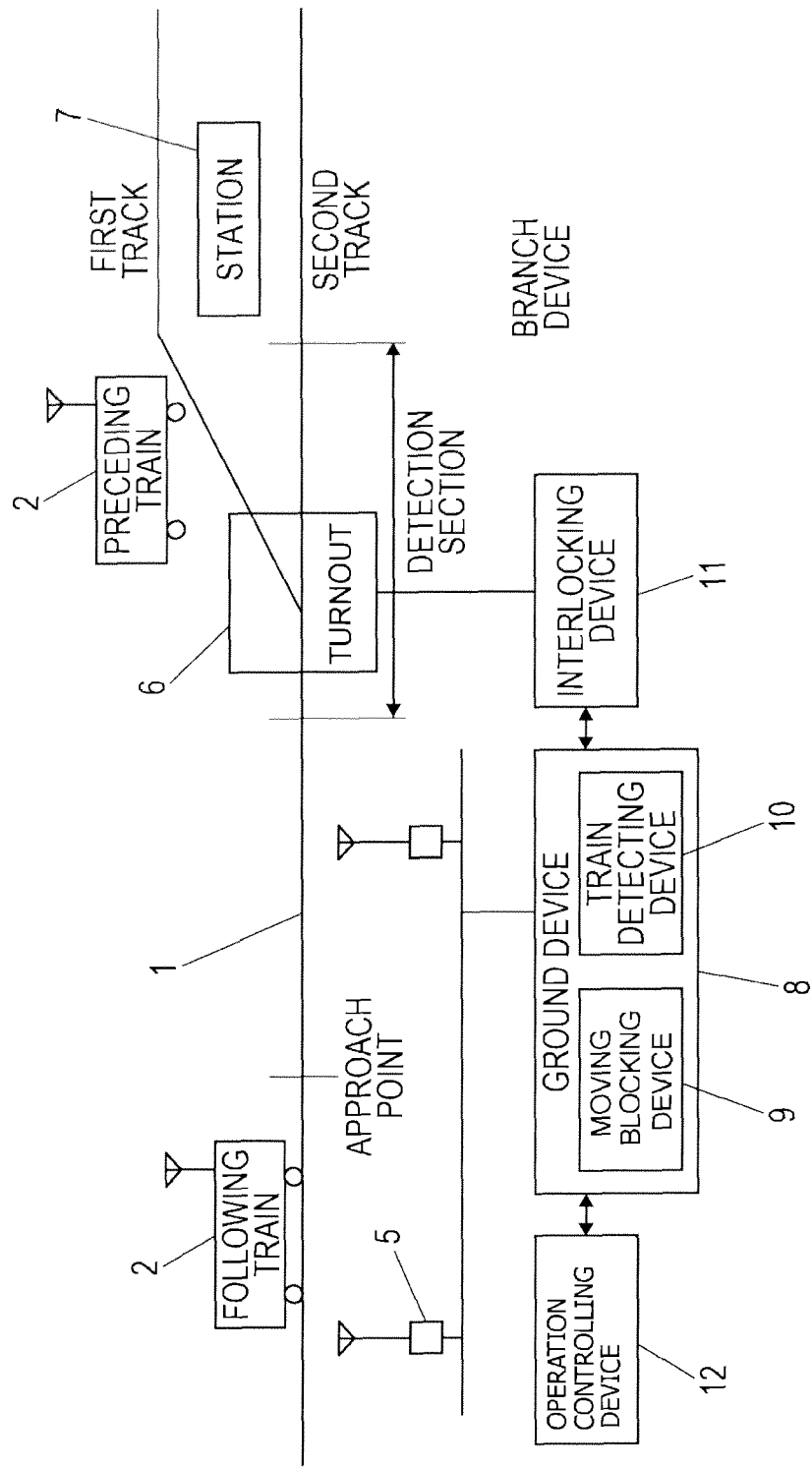
FIG. 2 is a schematic configuration view illustrating the embodiment of the train control system according to the present invention.
Figure 3:
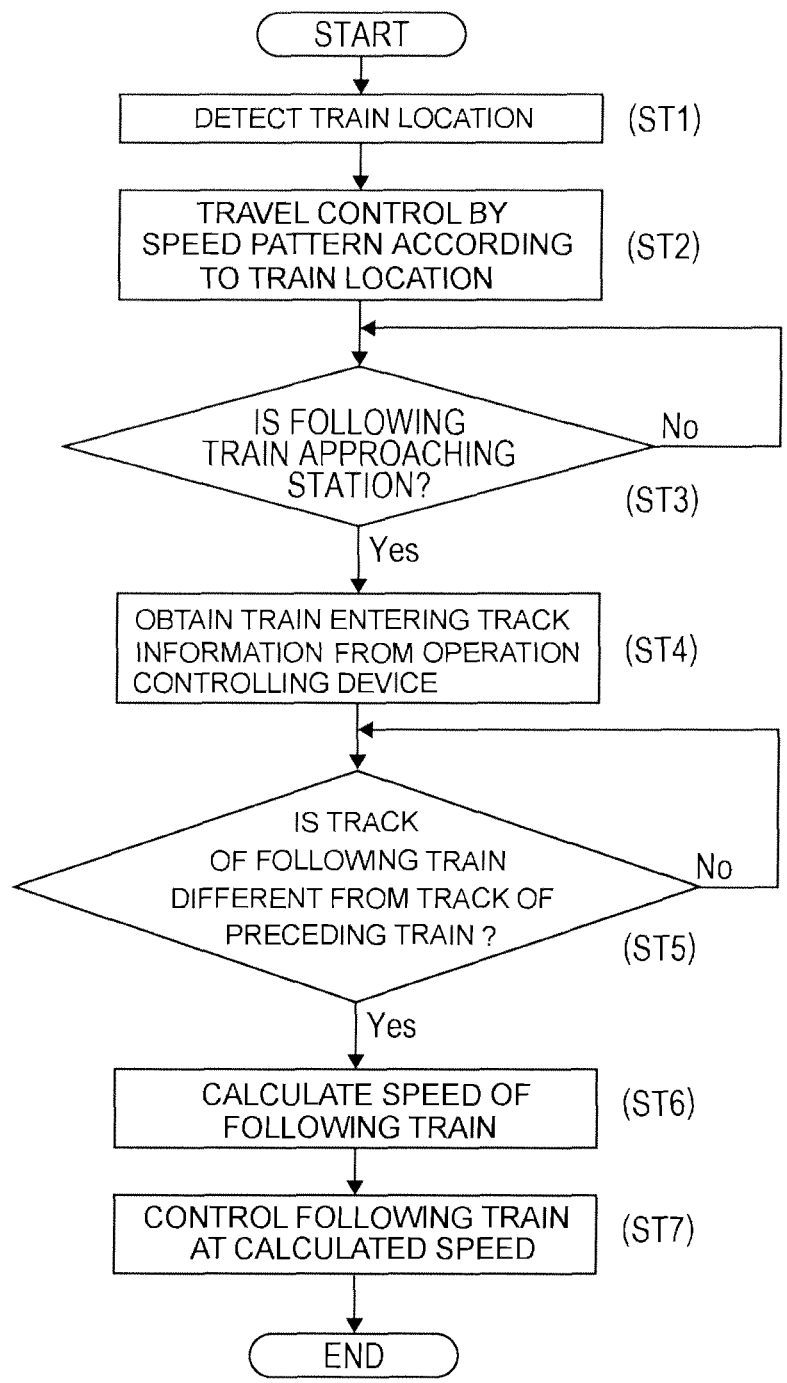
FIG. 3 is a flowchart illustrating the operation in the embodiment of the train control system according to the present invention.

FIG. 2 illustrates an example of the track 1 to which the train control system of the present invention is applied. The track 1 on which the train 2 travels is branched to divergent tracks 1 by a turnout 6. In the embodiment, a station 7 is located ahead of the divergent tracks 1, and first and second tracks are provided at the station 7 on the tracks 1 as approach paths. A predetermined range around the turnout 6 is a detector locking section, when the train 2 passes through the turnout 6, which prevents entry of another train 2. Before the detector locking section, an approach point as a stop target of the following train 2 is set. The location of the approach point is set so that the switching operation and locking of the turnout 6 are completed while the train 2 travels from the approach point to a point just before the detector locking section.

A ground device 8 is connected to each of the wayside radio sets 5. The ground device 8 is provided with a moving blocking device 9 and a train detecting device 10. To the train detecting device 10, an interlocking device 11 which controls the operation of the turnout 6 for switching the track 1 is connected. To the moving blocking device 9, an operation controlling device 12 which performs operation control on railroads of the train 2 is connected.

The operation controlling device 12 transmits number information and train schedule information of the train 2 to each of the ground devices 8, and the train detecting device 10 in each of the ground devices 8 calculates distance between the wayside radio set 5 and the train 2 by measuring communication time at the time of performing communication between the wayside radio set 5 and the vehicle radio set 4, and detects the location of the train 2. The moving blocking device 9 transmits information of a limiting speed and a possible travel distance based on the location information of the train 2 from the train detecting device 10 to each of the trains 2 via the wayside radio set 5 and the vehicle radio set 4, and the on-board device 3 generates a speed pattern in accordance with the braking performance of the train 2 on which the on-board device 3 mounted, and performs speed control on the basis of the speed pattern.

The moving blocking device 9 receives information of the train entering track from the operation controlling device 12, determines whether or not the following train 2 enters a track which differs from the track on which the preceding train 2 enters. When the track on which the following train 2 enters differs from the track on which the preceding train 2 enters, the moving blocking device 9 calculates traveling speed of the following train 2 so as to satisfy the following condition. "time until the preceding train passes through the detector locking section" equals to "time until the following train reaches the approach point"

The calculated traveling speed is transmitted to the on-board device 3.

The following train 2 travels in a state in which traveling speed is controlled on the basis of the traveling speed received by the on-board device 3. When the preceding train 2 passes through the detector locking section and enters a predetermined track, the turnout 6 is switched to the track on which the following train 2 enters and locked by the interlocking device 11. After the detector lock based on the preceding train 2 is released, the stop target of the following train 2 is reset to the normal position.

Next, a control operation according to the present embodiment will be described.

First, the wayside radio set 5 and the vehicle radio set 4 communicate with each other. Then, by measuring communication time thereof, each of the ground devices 8 calculates distances between the wayside radio set 5 and the train 2, to detect locations of the train 2 at that time (ST1).

The ground device 8 transmits information, such as speed limit and a possible travel distance, obtained based on the location information of the train 2, via the wayside radio sets 5 and the vehicle radio set 4, and the on-board device 3 generates a speed pattern in accordance with braking performance of the train 2 on which the on-board device 3 is mounted, and performs travel control of the train 2 in accordance with the speed pattern (ST2).

When the moving blocking device 9 receives information of the train entering track from the operation controlling device 12 and the preceding train 2 passes through the approach point, the turnout 6 is switched according to the train entering track information of the preceding train 2 to be locked.

After that, in the case in which the following train 2 approaches the station 7 (ST3), the moving blocking device 9 obtains the train entering track information from the operation controlling device 12 (ST4), and determines whether or not the following train 2 enters a track which differs from the track on which the preceding train 2 enters (ST5). In the case in which the track on which the following train 2 enters is different from the track on which the preceding train 2 enters (YES in ST5), the traveling speed of the following train 2 is calculated so that the time until the preceding train 2 passes through the detector locking section and the time until the following train 2 reaches the approach point become the same (ST6). The calculated traveling speed is transmitted to the on-board device 3.

The following train 2 travels in a state in which the traveling speed is controlled on the basis of the traveling speed received by the on-board device 3 (ST7). After the preceding train 2 passes through the detector locking section, the turnout 6 is switched to the track on which the following train 2 enters and locked by the interlocking device 11. When the detector lock based on the preceding train 2 is released, the stop target of the following train 2 is reset to the normal position. Therefore, the following train 2 can enter the second track.

As described above, in the embodiment, when the following train 2 approaches the station 7, the moving blocking device 9 receives the information of the train entering track from the operation controlling device 12. In the case in which the following train 2 enters a track which differs from the track of the preceding train 2, the traveling speed of the following train 2 is calculated so that the time until the preceding train 2 passes through the detector locking section and the time until the following train 2 reaches the approach point become the same. The speed of the following train 2 is controlled on the basis of the calculated traveling speed. Consequently, even in the case in which the tracks of the preceding train 2 and the following train 2 are different, without stopping the following train 2, the following train 2 can be made travel.

It should be noted that the entire contents of Japanese Patent Application No. 2011-218250, filed on Sep. 30, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A train control system comprising:
   on-board devices that each of which is mounted on respective trains traveling on a predetermined track;
   vehicle radio sets each of which is mounted on respective of the trains to be connected to the on-board devices;
   wayside radio sets each of which is disposed at a predetermined location on the ground to transmit information to and receive information from the vehicle radio sets;
   a ground device that is placed by the track and connected to the wayside radio sets;
   an operation controlling device that transmits operation information of the trains to the ground device; and
   a turnout that switches tracks,
   wherein the ground device is configured to detect a location of each of the trains based on wireless propagation time between the vehicle radio sets and the wayside radio sets to control an interval between a preceding train and a following train by a moving block control,
   wherein an approach point is set at a predetermined location before the turnout in a train travelling direction,
   wherein the ground device is further configured to:
   transmit information to and receive information from the on-board devices through a wayside radio set that is set at a predetermined location before the approach point in the train travelling direction and the vehicle radio sets,
   receive train entering track information from the operation controlling device to determine whether or not a following train enters a track which differs from that a preceding train entered, and
   control travelling speed of the following train so that the following train can travel without stopping, when the following train enters the track which differs from the track that the preceding train entered.

2. The train control system according to claim 1,
   wherein the ground device is configured to:
   calculate traveling speed of the following train at which the following train can travel without stopping until the switching operation of the turnout through which the preceding train has passed is completed, when the following train enters the track which differs from that the preceding train entered, and
   transmit a calculated traveling speed of the following train to an on-board device mounted on the following train.

3. The train control system according to claim 1,
   wherein a predetermined range around the turnout is a detector locking section, the detector locking section, when a train passes through the turnout, being prevented from entering by another train, and the approach point is set at a predetermined location before the detector locking section in the train travelling direction,
   wherein the ground device is configured to:
   calculate traveling speed of the following train in accordance with the condition that "time until the preceding train passes through a detector locking section" equals to "time until the following train reaches the approach point", when the following train enters the track which differs from that the preceding train entered, and
   transmit a calculated traveling speed of the following train to an on-board device mounted on the following train.

4. The train control system according to claim 1, wherein the train entering track information is information about a track on which a train arrives at a station.

5. The train control system according to claim 1,
   wherein the ground device is configured to set the approach point as a stop target of the following train, when the following train enters the track which differs from that the preceding train entered,
   wherein the stop target of the following train is reset to a normal position after the preceding train passes through the detector locking section to enable the following train to enter the track which differs from that of the preceding train.

6. A ground control system for use in a train control system that includes (i) on-board devices, each mounted on a respective preceding and following trains each traveling on a predetermined track, (ii) vehicle radio sets, each mounted on the respective preceding and following trains, to be connected to the respective on-board devices, (iii) wayside radio sets disposed at predetermined locations on the ground, including a first wayside radio set disposed at a predetermined location on the ground before an approach point, the approach point being set at a predetermined location in a train traveling direction before a turnout that switches tracks, the wayside radio sets communicate with the vehicle radio sets, the ground control system comprising:

an operation controlling device that transmits operation information of the trains to a ground device; and the ground device configured to:

detect a location of each of the trains based on wireless propagation time between the vehicle radio sets and the wayside radio sets to control an interval between a preceding train and a following train, transmit information to and receive information from the on-board devices using the first wayside radio set and the vehicle radio sets, receive train entering track information from the operation controlling device to determine whether or not the following train enters a track which differs from the track that the preceding train entered, and control travelling speed of the following train using the information about the location of the preceding train, operation information of the preceding train, and the train entering track information, so that the following train can travel without stopping.

* * * * *